(12) United States Patent
Boley et al.

(10) Patent No.: US 7,255,098 B1
(45) Date of Patent: Aug. 14, 2007

(54) ENGINE EMISSIONS CONTROL SYSTEM

(75) Inventors: William Boley, Lafayette, IN (US); Stuart Niese, Lafayette, IN (US); Ryan E. Meister, Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 11/411,796

(22) Filed: Apr. 27, 2006

(51) Int. Cl.
*F02D 41/14* (2006.01)
(52) U.S. Cl. ...................... 123/679; 123/681
(58) Field of Classification Search ............. 123/679, 123/681
See application file for complete search history.

(56) References Cited

U.S. PATENT DOCUMENTS

| | | | |
|---|---|---|---|
| 4,461,261 A | 7/1984 | Isomura et al. | |
| 5,020,499 A | 6/1991 | Kojima et al. | |
| 6,012,282 A | 1/2000 | Kato et al. | |
| 6,161,378 A | 12/2000 | Hanaoka et al. | |
| 6,289,672 B1 | 9/2001 | Katoh et al. | |
| 6,370,473 B1 | 4/2002 | Yasui et al. | |
| 6,477,458 B1 | 11/2002 | Yasui et al. | |
| 6,477,834 B1 | 11/2002 | Asanuma et al. | |
| 6,581,571 B2 * | 6/2003 | Kubesh et al. | 123/679 |
| 6,728,625 B2 | 4/2004 | Strubhar et al. | |
| 6,739,122 B2 | 5/2004 | Kitajima et al. | |
| 2005/0056002 A1 | 3/2005 | Nagawa et al. | |

FOREIGN PATENT DOCUMENTS

| | | |
|---|---|---|
| JP | 61279748 | 12/1986 |
| JP | 07127503 | 5/1995 |
| JP | 11107807 | 4/1999 |
| WO | WO 03/056160 A1 | 7/2003 |

* cited by examiner

*Primary Examiner*—Erick Solis

(57) ABSTRACT

An engine emissions control system is provided. The system may include an exhaust producing engine and an exhaust system through which the exhaust produced by the engine may flow. The system may also include a $NO_x$ sensor configured to take a $NO_x$ measurement of the amount of $NO_x$ in the exhaust produced by the engine. The system may further include a charge density sensing system configured to measure the charge density of a combustion mixture of the engine. In addition, the system may include a controller configured to receive information related to the measurement of the amount of $NO_x$. The controller may be further configured to control a charge density of the combustion mixture with which the engine operates based on the $NO_x$ measurement and the charge density measured by the charge density sensing system.

20 Claims, 4 Drawing Sheets

ENGINE EMISSIONS CONTROL SYSTEM

TECHNICAL FIELD

The present disclosure is directed to an engine emissions control system and, more particularly, to an engine emissions control system having a $NO_x$ sensor and a charge density sensing system.

BACKGROUND

Engines, including diesel engines, gasoline engines, natural gas engines, and other engines known in the art, may exhaust a complex mixture of air pollutants. The air pollutants may be composed of both gaseous and solid material, such as, for example, nitrous oxides ($NO_x$).

Due to increased environmental concerns, exhaust emission standards have become more stringent. The amount of particulate matter and gaseous pollutants emitted from an engine may be regulated depending on the type, size, and/or class of engine. In order to meet these emissions standards, engine manufacturers have pursued improvements in several different engine technologies, such as fuel injection, engine management, and air induction, to name a few. In addition, engine manufacturers have developed devices for treatment of engine exhaust after it leaves the engine.

Engine manufacturers have employed exhaust sensors, such as oxygen sensors and $NO_x$ sensors, which may detect levels of exhaust constituents on which engine control may be based. For example, systems have been developed that include an oxygen sensor, which may measure the amount of oxygen in the exhaust. The level of oxygen in the exhaust may be indicative of whether the air-fuel ratio (AFR) is within desired specifications. Engine control parameters, such as those affecting AFR, may be varied based on oxygen levels measured by an oxygen sensor.

Other systems may employ a $NO_x$ sensor for measuring the level of $NO_x$ in the exhaust. Systems have been developed that control engine parameters based on measurements taken by a $NO_x$ sensor. For example, one such system is disclosed by U.S. Pat. No. 6,370,473 issued to Yasui et al. on Apr. 9, 2002 ("the '473 patent"). The '473 patent discloses a system, wherein a $NO_x$ sensor is utilized to measure the amount of $NO_x$ in the exhaust. The '473 patent further discloses that an air-fuel ratio (AFR) of the combustion mixture may be controlled by controlling fuel supply based on the measurements taken by the $NO_x$ sensor.

While the system of the '473 patent may include a $NO_x$ sensor and may be configured to control one or more engine parameters based on measurements taken by the $NO_x$ sensor, $NO_x$ levels may be dependent on a number of different operating parameters. Except for air-fuel ratio, the system of the '473 patent does not control any of these different operating parameters based on the $NO_x$ measurement. In situations where an undesireable $NO_x$ level is due to an operating parameter other than air-fuel ratio, the system of the '473 patent may not be capable of rectifying the undesireable $NO_x$ level. For example, the '473 patent does not measure charge density, which may have a significant effect on $NO_x$ levels. Accordingly, if an undesirable $NO_x$ level is due to variations in charge density, the system of the '473 patent would not be able to detect the source of the problem, and therefore would not be able to correct it.

The present disclosure is directed to solving one or more of the problems described above.

SUMMARY OF THE INVENTION

In one aspect, the present disclosure is directed to an engine emissions control system. The system may include an exhaust producing engine and an exhaust system through which the exhaust produced by the engine may flow. The system may also include a $NO_x$ sensor configured to take a $NO_x$ measurement of the amount of $NO_x$ in the exhaust produced by the engine. The system may further include a charge density sensing system configured to measure the charge density of a combustion mixture of the engine. In addition, the system may include a controller configured to receive information related to the measurement of the amount of $NO_x$. The controller may be further configured to control a charge density of the combustion mixture with which the engine operates based on the $NO_x$ measurement and the charge density measured by the charge density sensing system.

In another aspect, the present disclosure is directed to an engine emissions control system. The system may include an exhaust producing, gaseous fuel burning engine and an exhaust system through which the exhaust produced by the engine may flow. The system may include a $NO_x$ sensor configured to take a $NO_x$ measurement of the amount of $NO_x$ in the exhaust produced by the engine. The system may also include a controller configured to receive information related to the $NO_x$ measurement. The controller may be further configured to control a charge density with which the engine operates based on the $NO_x$ measurement.

In another aspect, the present disclosure is directed to a method of controlling emissions of an exhaust producing engine. The method may include directing exhaust produced by the engine through an exhaust system. The method may also include taking a $NO_x$ measurement of the amount of $NO_x$ in the exhaust produced by the engine and measuring the charge density of a combustion mixture of the engine. The method may further include controlling a charge density of the combustion mixture based on the $NO_x$ measurement and the measured charge density.

DETAILED DESCRIPTION

Reference will now be made in detail to the drawings. Wherever possible, the same reference numbers will be used throughout the drawings to refer to the same or like parts.

Figure 1:
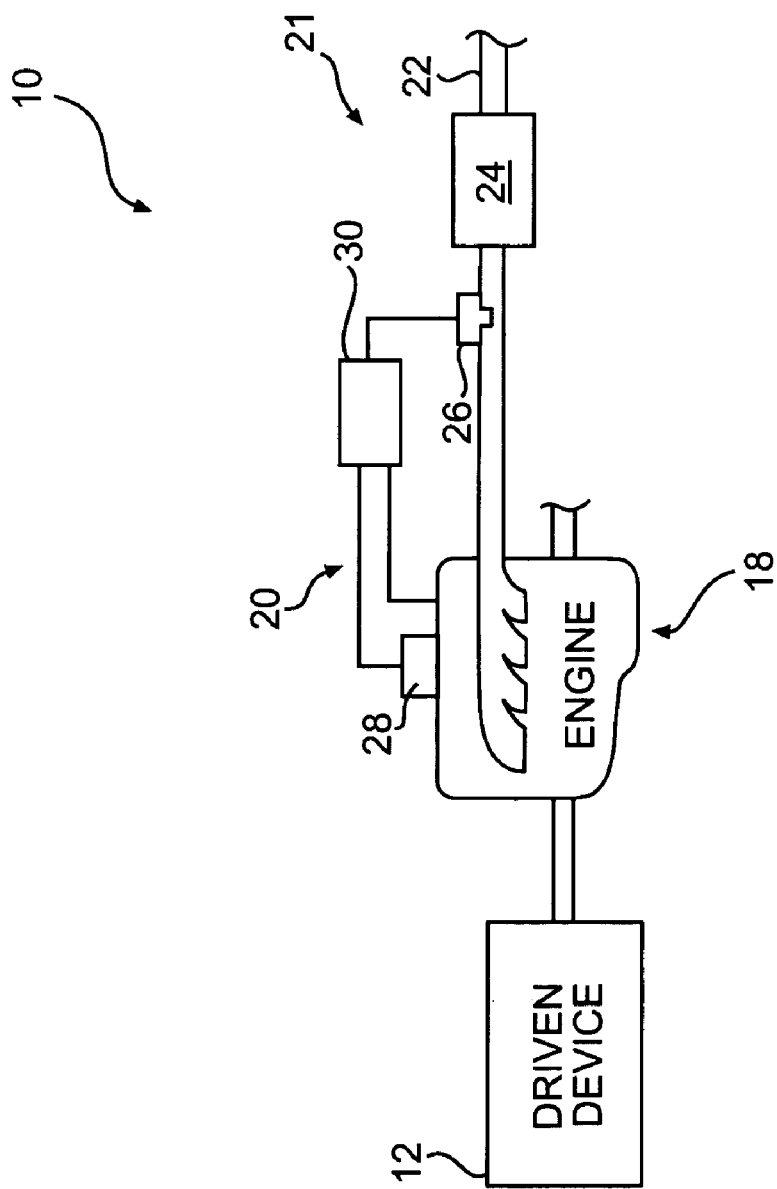
FIG. 1 is a diagrammatic illustration of a machine according to an exemplary disclosed embodiment.

FIG. 1 illustrates a machine 10. Machine 10 may include at least one driven device 12, an engine 18 configured to drive at least one component of machine 10, such as driven device 12, and an engine emissions control system 20.

Although machine 10 is shown as a stationary electrical power generation set, machine 10 could be any type of machine having an exhaust producing engine. For example, in some embodiments, machine 10 may be mobile, and may include a vehicle or a component of a vehicle.

Driven device 12 may include any type of driven equipment, including, for example, an electric generator, a compressor, a chiller, a pump (e.g., for water or any other fluid), and/or a vehicular propulsion system (e.g., a land vehicle drive train, a sea-going vehicle propeller, or any other type of propulsion device). Driven device 12 may also control other auxiliary type devices, such as cooling fans, alternators, air-conditioning units, etc.

Engine 18 may include any kind of engine that produces an exhaust flow of exhaust gases. For example, engine 18 may be an internal combustion engine, such as a gasoline engine, a diesel engine, a gaseous fuel burning engine or any other exhaust gas producing engine.

System 20 may include an exhaust system 21, which may include an exhaust conduit 22, an after-treatment device 24, and a $NO_x$ sensor 26. System 20 may also include a charge density sensing system 28 and a controller 30. These and other components of system 20 will be discussed in greater detail below in conjunction with FIGS. 2-4.

After-treatment device 24 may be any type of device configured to remove one or more constituents from the exhaust flow of engine 18. After-treatment device 24 may include a particulate trap, catalyst-based device (e.g., catalytic converter), catalytic particulate trap, $NO_x$ adsorber, or any other device configured to treat exhaust gases after they leave engine 18. In some embodiments, after-treatment device 24 may include combinations of these types of devices. In addition, although system 20 is shown with a single after-treatment device 24, system 20 may include more than one after-treatment device 24. Embodiments with more than one after-treatment device may include two or more different after-treatment devices or two of the same type of after-treatment devices. Such multiple after-treatment devices may be positioned in series (e.g., along exhaust conduit 22) or in parallel (e.g., in dual exhaust conduits; not shown).

Figure 2:
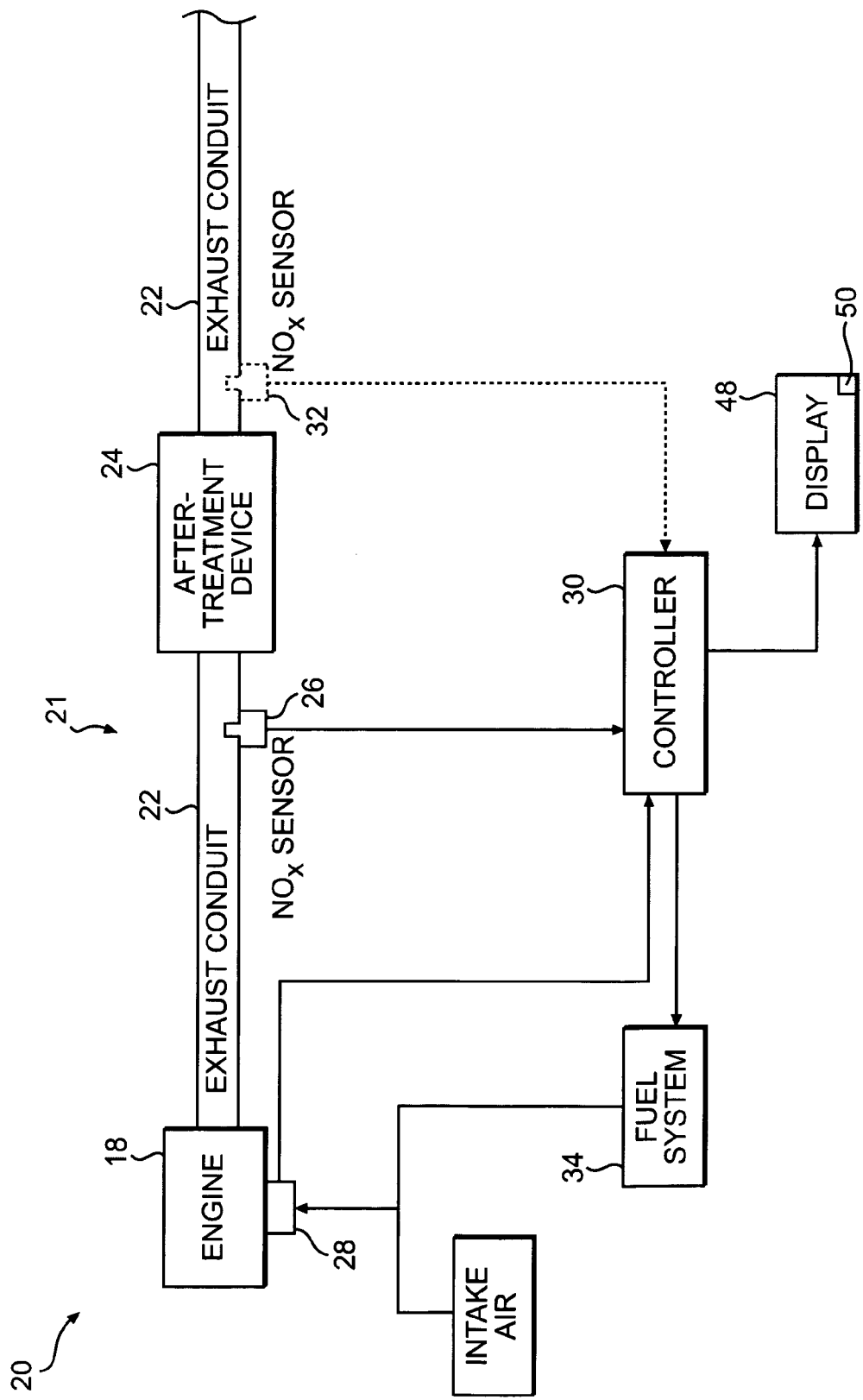
FIG. 2 is a block diagram representation of an engine emissions control system according to an exemplary disclosed embodiment.
Figure 3:
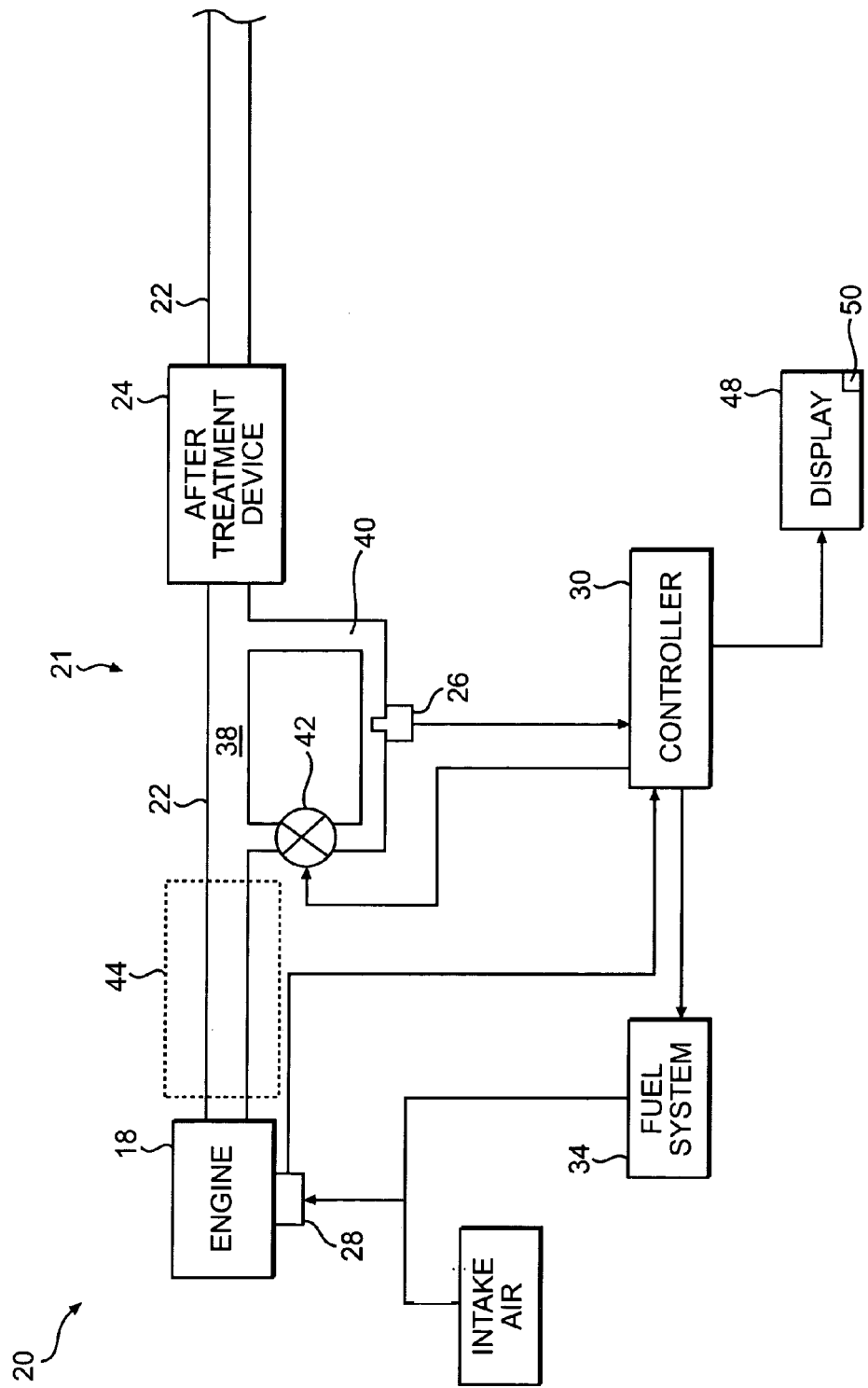
FIG. 3 is a block diagram representation of an engine emissions control system according to another exemplary disclosed embodiment.
Figure 4:
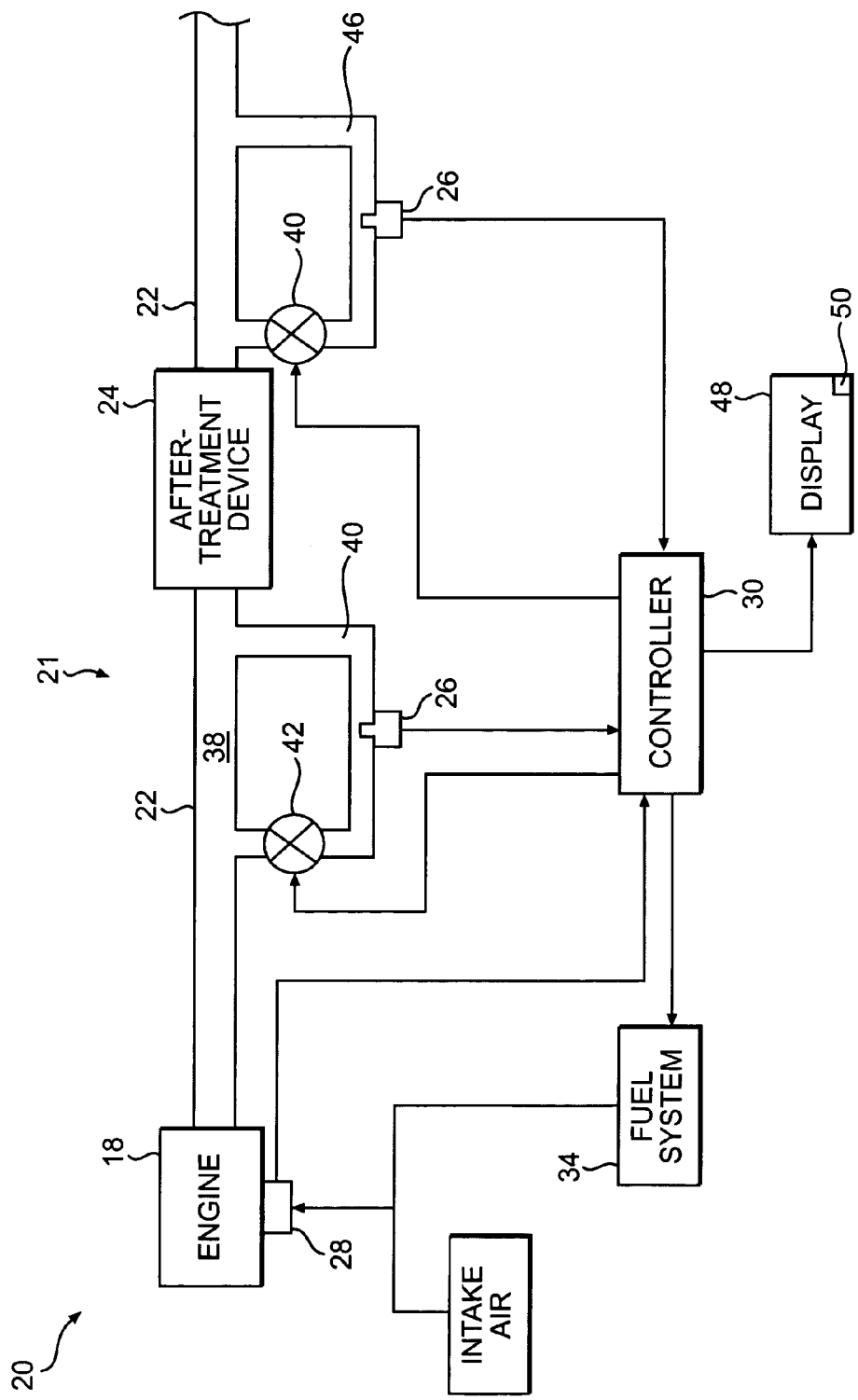
FIG. 4 is a block diagram representation of an engine emissions control system according to another exemplary disclosed embodiment.

FIG. 2 is a block diagram representation of a first embodiment of system 20. $NO_x$ sensor 26 may be configured to take measurements of the amount of $NO_x$ in the exhaust produced by engine 18. The embodiment shown in FIG. 2 may be configured to continuously measure the amount of $NO_x$ in the exhaust. In such an embodiment, $NO_x$ sensor 26 may be located in a main exhaust flow pathway, such as exhaust conduit 22, as shown in FIG. 2. As used herein, the term continuously refers to repeated measurements taken in close succession. For example, continuous measurement may include measurements taken every few seconds or milliseconds. Although the embodiment shown in FIG. 2 may be configured for continuous $NO_x$ measurement (i.e., by being located in the main exhaust flow path), such an embodiment could be used for periodic measurement. As used herein, the term periodic refers to measurements taken at somewhat longer intervals, such as every few minutes, hours, days, etc. Some embodiments may employ configurations that take advantage of these somewhat longer time intervals between measurements. Several such embodiments are shown in FIG. 3 and FIG. 4 and are discussed in greater detail below.

$NO_x$ sensor 26 may be located anywhere along exhaust conduit 22. For example, $NO_x$ sensor 26 may be located upstream of after-treatment device 24, as shown in FIG. 2. Placement of $NO_x$ sensor 26 upstream of after-treatment device 24 may enable measurement of $NO_x$ levels in exhaust conduit 22 that may be attributed to one or more engine operating parameters (e.g., charge density, air-fuel ratio, spark timing, valve timing, engine speed, engine load, throttle position, etc.).

Alternatively, $NO_x$ sensor 26 may be located downstream from after-treatment device 24, as illustrated by a dashed $NO_x$ sensor outline 32. Placement of $NO_x$ sensor 26 downstream of after-treatment device 24 may enable measurement of $NO_x$ levels in exhaust conduit 22 that may be attributed to the combined effect of engine operating parameters, such as those mentioned above, and treatment of the exhaust by after-treatment device 24. For example, in an embodiment where after-treatment device 24 is a $NO_x$ adsorber, placement of $NO_x$ sensor 26 may enable measurement of the amount of $NO_x$ in exhaust conduit 22 after the $NO_x$ adsorber has removed some of the $NO_x$ produced by engine 18. Such a measurement may be indicative of the level of $NO_x$ that will be released to the atmosphere.

Some embodiments of system 20 may include more than one $NO_x$ sensor 26. For example, one embodiment may include $NO_x$ sensor 26 located upstream of after-treatment device 24 and a $NO_x$ sensor 26 located downstream of after-treatment device 24, as illustrated by dashed $NO_x$ sensor outline 32. Inclusion of both of these sensors may enable measurement of $NO_x$ output by engine 18 as well as measurement of $NO_x$ content of exhaust that has been treated by after-treatment device 24, as discussed above. Additionally, inclusion of both of these sensors may enable monitoring of performance of after-treatment device 24. For example, by monitoring $NO_x$ levels both upstream and downstream of a $NO_x$ adsorber, system 20 may be configured to determine whether the $NO_x$ adsorber is removing as much $NO_x$ from the exhaust as is desired. This may enable controller 30 to determine whether an abnormally high $NO_x$ measurement is the result of engine operating parameters or of a reduction in performance of the $NO_x$ adsorber. Based on such a determination, controller 30 may be configured to take appropriate measures to rectify the abnormally high $NO_x$ level.

If the source of the high $NO_x$ level is determined to be engine operating parameters, then controller 30 may adjust one or more of these parameters to reduce the $NO_x$ level. If the source of the high $NO_x$ level is reduced performance of the $NO_x$ adsorber, then controller 30 may initiate some sort of alert, such as a warning light, audible alert, and/or fault code, to notify owners, operators, service technicians, etc. that there may be a problem with the $NO_x$ adsorber.

Charge density sensing system 28 may be configured to measure the charge density of a combustion mixture of engine 18. Charge density sensing system 28 may include any sensing devices and/or equipment suitable for measuring the density of the combustion mixture as it is delivered to the combustion chambers of engine 18. Such a measurement may be taken, at any suitable location along the intake flow path of engine 18. For example, charge density sensing system 28 may include a pressure sensing device and a temperature sensing device located in an intake manifold (not shown) of engine 18. Charge density sensing system 28 may also include equipment configured to monitor engine speed, engine load, and other such parameters.

Charge density sensing system 28 may be located downstream of any forced induction devices (e.g., supercharger or turbocharger; not shown) associated with engine 18. More details regarding exemplary systems and methods for monitoring charge density are disclosed in U.S. Pat. No. 6,728,625, the entire disclosure of which is incorporated herein by reference. Those skilled in the art will recognized that charge density could be measured other ways besides those described in this application and in U.S. Pat. No. 6,728,625.

Controller 30 may include any means for receiving machine operating parameter-related information and/or for monitoring, recording, storing, indexing, processing, and/or communicating such information. These means may include components such as, for example, a memory, one or more data storage devices, a central processing unit, or any other components that may be used to run an application.

Although aspects of the present disclosure may be described generally as being stored in memory, one skilled in the art will appreciate that these aspects can be stored on or read from types of computer program products or computer-readable media, such as computer chips and secondary storage devices, including hard disks, floppy disks, optical media, CD-ROM, or other forms of RAM or ROM. Various other known circuits may be associated with controller 30, such as power supply circuitry, signal-conditioning circuitry, solenoid driver circuitry, communication circuitry, and other appropriate circuitry.

Controller 30 may be configured to perform multiple processing and controlling functions, such as, for example, engine management (e.g., controller 30 may include an engine control module, a.k.a. an ECM), monitoring/calculating various parameters related to exhaust output and after-treatment thereof, etc. In some embodiments, machine 10 may include multiple controllers (a configuration not shown), each dedicated to perform one or more of these or other functions. Such multiple controllers may be configured to communicate with one another. This communication may be performed via a datalink. An exemplary datalink may include Controller Area Network (CAN).

Controller 30 may be configured to receive information from various sources and control one or more components of system 20 based on this information. For example, controller 30 may be configured to receive information related to the measurement of the amount of $NO_x$, as well as information related to measurements taken by charge density sensing system 28. Further, controller 30 may be configured to determine a charge density, as discussed above. Controller 30 may also be configured to control the charge density of the combustion mixture with which engine 18 operates based on the $NO_x$ measurement and/or the charge density measured by charge density sensing system 28. Controller 30 may be configured to control the charge density by varying one or more aspects of fuel delivery through control of a fuel system 34. Alternatively or additionally, controller may be configured to control the charge density by varying one or more aspects of charge air flow. By controlling one or more aspects of fuel delivery and/or one or more aspects of charge air flow, the air-fuel ratio may also be affected.

In some embodiments, the functions of controller 30 may be protected from tampering. For example, the structure, electronics, and/or software of controller 30 may be configured to prevent one skilled in operating and/or servicing machine 10 from altering settings for various operating parameters associated with one or more components of system 20. In one embodiment, controller 30 may be protected from tampering that may included altering air-fuel ratio and/or timing setpoints.

FIG. 3 and FIG. 4 illustrate alternative embodiments of system 20. As mentioned above, FIGS. 3 and 4 show configurations of system 20 that may take advantage of the longer time intervals between periodic $NO_x$ measurements. As illustrated in FIGS. 3 and 4, exhaust system 21 may include a main flow path 38 and a bypass flow path 40. $NO_x$ sensor 26 may be located in bypass flow path 40. Bypass flow path 40 may include a valve 42 controllable by controller 30 to periodically open, allowing a sample of exhaust gases to enter bypass flow path 40 such that $NO_x$ sensor 26 may measure the amount of $NO_x$ in the exhaust sample. By only exposing $NO_x$ sensor 26 to exhaust gases periodically, the functional life of $NO_x$ sensor 26 may be extended.

With further regard to FIG. 3, in embodiments that include bypass flow path 40, after-treatment device 24 may be positioned downstream of bypass flow path 40. Alternatively, after-treatment device 24 may be positioned upstream of bypass flow path 40 as illustrated by a dashed box 44.

FIG. 4 illustrates an embodiment, which may include more than one bypass flow path. For example, system 21 may include two bypass flow paths. Bypass flow path 40 may be located upstream of after-treatment device 24. A second bypass flow path 46 may be located downstream of after-treatment device 24. Such an embodiment may facilitate uses similar to those discussed above with regard to the dual sensor configuration shown in FIG. 2.

System 20 may include a display 48. Display 48 may be located at any suitable location on machine 10. Display 48 may be any kind of display, including screen displays, such as, for example, cathode ray tubes (CRTs), liquid crystal displays (LCDs), plasma screens, and the like. Display 48 may be configured to display information about operating parameters of system 20. In one embodiment, display 48 may include a warning indicator 50 (e.g., a warning lamp, warning message, etc.). Controller 30 may be configured to illuminate warning indicator 50 upon detection of one or more faults. As an alternative to or in addition to display 48, system 20 may include one or more audible alerts for conveying information about operating parameters of system 20 to an operator. In addition to providing visual feedback regarding operating parameters of system 20, display 48 may also be configured to display other information regarding system 20 or any other device and/or system associated with machine 10.

INDUSTRIAL APPLICABILITY

The disclosed engine emissions control system 20 may be suitable to enhance exhaust emissions control for engines. System 20 may be used for any application of an engine. Such applications may include supplying power for machines, such as, for example, stationary equipment such as power generation sets, or mobile equipment, such as vehicles. The disclosed system may be used for any kind of vehicle, such as, for example, automobiles, buses, trucks, construction machines (including those for on-road, as well as off-road use), and other heavy equipment.

Not only may the disclosed system be applicable to various applications of an engine, but the disclosed system may be applicable to various types of engines as well. For example, system 20 may be applicable to any exhaust producing engine, which may include gasoline engines, diesel engines, gaseous fuel burning engines, etc. Exemplary gaseous fuel burning engines may include, but are not limited to, engines that run on any of a variety of gaseous fuels, such as, for example, natural gas, digester gas, landfill gas, propane, coal bed methane, well head gas, etc. System 20 may also be applicable to a variety of engine configurations, including various cylinder configurations, such as "V" cylinder configurations (e.g., V6, V8, V12, etc.), inline cylinder configurations, and horizontally opposed cylinder configurations. System 20 may also be applicable to engines with a variety of induction types. For example, system 20 may be applicable to normally aspirated engines, as well as those with forced induction (e.g., turbocharging or supercharging). Engines to which system 20 may be applicable may include combinations of these configurations (e.g., a turbocharged, inline-6 cylinder, diesel engine).

One advantage of the disclosed system may include adaptability to variations in the composition of gaseous fuels. The composition of gaseous fuels may vary significantly throughout the world, and even within a given country. The disclosed system may incorporate a charge density feedback loop, which may enable engine 18 to automatically tune the charge density and/or any other engine operating parameters appropriately for whatever the fuel formulation may be. The disclosed system may be capable of operating on a wide range of gaseous fuel formulations without the need for on-site tuning or other types of customization of various engine parameters (e.g., timing, air-fuel ratio, etc.). The disclosed system may also employ a $NO_x$ sensor feedback loop, which may enable engine 18 to automatically tune the charge density even more precisely.

An exemplary method of using system 20 may include directing exhaust produced by engine 18 through system 20. The method may also include taking a $NO_x$ measurement of the amount of $NO_x$ in the exhaust produced by engine 18 and measuring the charge density of a combustion mixture of the engine. The method may further include controlling a charge density of the combustion mixture based on the $NO_x$ measurement and the measured charge density. Charge density control may be accomplished by varying one or more aspects of fuel delivery (e.g., pressure, delivery rate, etc.).

An exemplary method of using system 20 may include measuring the amount of $NO_x$ in the exhaust continuously. Alternatively, the method may include measuring the amount of $NO_x$ in the exhaust periodically.

It will be apparent to those having ordinary skill in the art that various modifications and variations can be made to the disclosed engine emissions control system without departing from the scope of the invention. Other embodiments of the invention will be apparent to those having ordinary skill in the art from consideration of the specification and practice of the invention disclosed herein. It is intended that the specification and examples be considered as exemplary only, with a true scope of the invention being indicated by the following claims and their equivalents.

What is claimed is:

1. An engine emissions control system, comprising:
   an exhaust producing engine;
   an exhaust system through which the exhaust produced by the engine flows;
   the exhaust system including a $NO_x$ sensor configured to take a $NO_x$ measurement of the amount of $NO_x$ in the exhaust produced by the engine;
   a charge density sensing system configured to measure the charge density of a combustion mixture of the engine; and
   a controller configured to:
      receive information related to the measurement of the amount of $NO_x$; and
      control a charge density of the combustion mixture with which the engine operates based on the $NO_x$ measurement and the charge density measured by the charge density sensing system.

2. The system of claim 1, wherein the controller is configured to control the charge density by varying one or more aspects of fuel delivery or one or more aspects of charge air flow.

3. The system of claim 1, wherein the system is configured to continuously measure the amount of $NO_x$ in the exhaust.

4. The system of claim 1, wherein the system is configured to periodically measure the amount of $NO_x$ in the exhaust.

5. The system of claim 4, wherein the exhaust system includes a main flow path and a bypass flow path, and wherein the $NO_x$ sensor is located in the bypass flow path.

6. The system of claim 1, wherein the engine is a gaseous fuel burning engine.

7. The system of claim 1, wherein the functions of the controller are protected from tampering.

8. An engine emissions control system, comprising:
   an exhaust producing gaseous fuel burning engine;
   an exhaust system through which the exhaust produced by the engine flows;
   the exhaust system including a $NO_x$ sensor configured to take a $NO_x$ measurement of the amount of $NO_x$ in the exhaust produced by the engine; and
   a controller configured to:
      receive information related to the $NO_x$ measurement; and
      control a charge density with which the engine operates based on the $NO_x$ measurement;
   wherein the functions of the controller are protected from tampering.

9. The system of claim 8, wherein the controller is configured to control the charge density by varying one or more aspects of fuel delivery or one or more aspects of charge air flow.

10. The system of claim 8, wherein the system is configured to periodically measure the amount of $NO_x$ in the exhaust.

11. The system of claim 10, wherein the exhaust system includes a main flow path and a bypass flow path, and wherein the $NO_x$ sensor is located in the bypass flow path.

12. The system of claim 8, wherein the functions of the controller are protected from tampering that may include at least one of altering air-fuel ratio and altering timing setpoints.

13. A method of controlling emissions of an exhaust producing engine, comprising:
    directing exhaust produced by the engine through an exhaust system;
    taking a $NO_x$ measurement of the amount of $NO_x$ in the exhaust produced by the engine;
    measuring the charge density of a combustion mixture of the engine;
    controlling a charge density of the combustion mixture based on the $NO_x$ measurement and the measured charge density.

14. The method of claim 13, wherein controlling the charge density is accomplished by varying one or more aspects of fuel delivery or one or more aspects of charge air flow.

15. The method of claim 13, further including continuously measuring the amount of $NO_x$ in the exhaust.

16. The method of claim 13, further including periodically measuring the amount of $NO_x$ in the exhaust.

17. A machine, comprising:
    an exhaust producing engine configured to drive at least one component of the machine;
    an exhaust system through which the exhaust produced by the engine flows;

the exhaust system including a $NO_x$ sensor configured to take a $NO_x$ measurement of the amount of $NO_x$ in the exhaust produced by the engine;

a charge density sensing system configured to measure the charge density of a combustion mixture of the engine; and a controller configured to:
   receive information related to the $NO_x$ measurement; and
   control a charge density with which the engine operates, based on the $NO_x$ measurement and the charge density measured by the charge density sensing system, by varying one or more aspects of fuel delivery or one or more aspects of charge air flow.

18. The system of claim 17, wherein the system is configured to periodically measure the amount of $NO_x$ in the exhaust.

19. The system of claim 18, wherein the exhaust system includes a main flow path and a bypass flow path, and wherein the $NO_x$ sensor is located in the bypass flow path.

20. The system of claim 17, wherein the functions of the controller are protected from tampering.

* * * * *